UNITED STATES PATENT OFFICE.

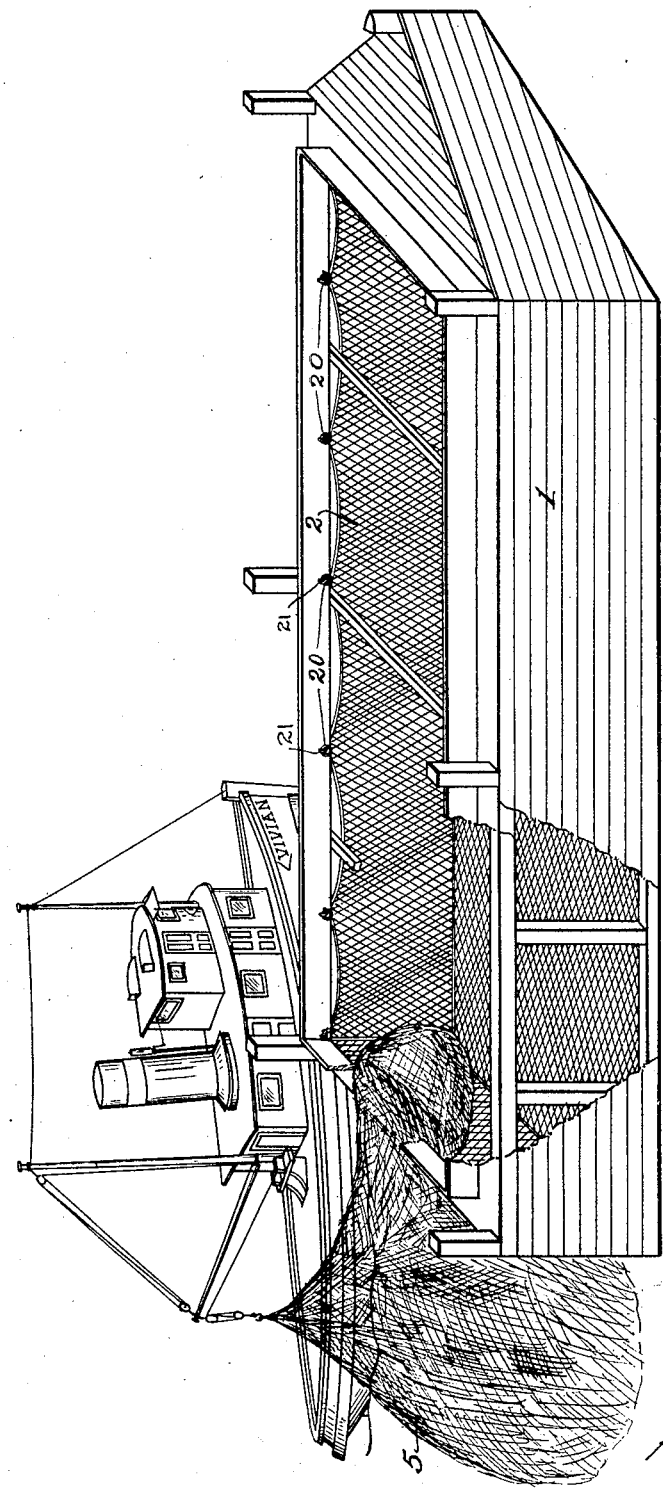

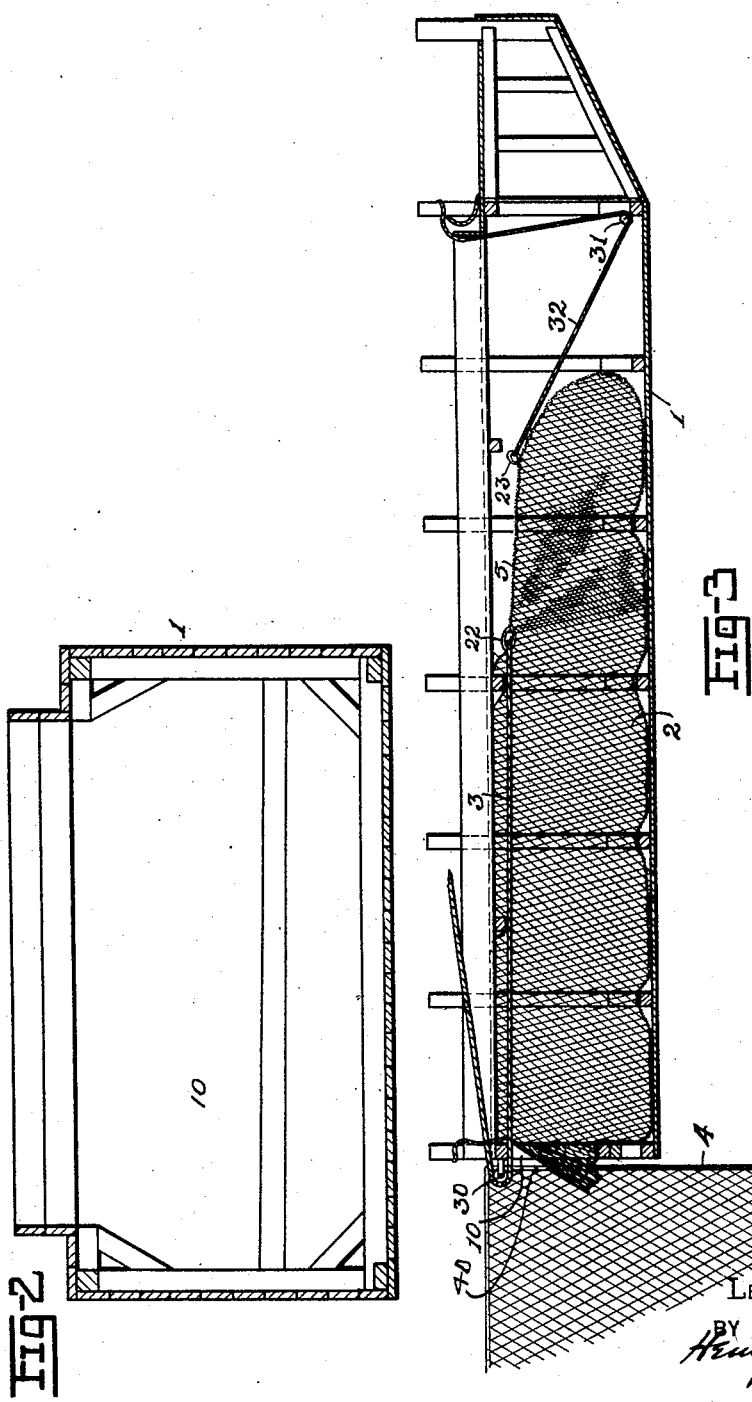

LEE H. WAKEFIELD, OF SEATTLE, WASHINGTON.

LIVE-FISH-TRANSPORTING BARGE.

1,332,653.  Specification of Letters Patent.  Patented Mar. 2, 1920.

Application filed October 17, 1918. Serial No. 258,493.

*To all whom it may concern:*

Be it known that I, LEE H. WAKEFIELD, a citizen of the United States, and resident of the city of Seattle, county of King, and State of Washington, have invented certain new and useful Improvements in Live-Fish-Transporting Barges, of which the following is a specification.

My invention relates to devices for employment in the transportation of live fish and is designed particularly for carrying the fish from the fishing nets, where they are caught alive, to the cannery or the place where the fish are put up, and to retain them alive and fresh.

My invention is more particularly designed for handling herring between the points where they are netted by the fishermen and the factory, where they are put up.

The features of my invention, which I consider to be new, will be hereinafter described and then particularly defined by the claims.

In the accompanying drawings I have shown a device constructed in accordance with my invention which may be employed for this purpose.

Figure 1 shows, in perspective, the fish carrying or transporting barge, and the manner of filling the same from the net in which the fish are caught.

Fig. 2 is a cross section through the barge.

Fig. 3 is a longitudinal section through the barge showing it in its relation to the impounding or storing trap into which the fish may be discharged from the barge.

It is desirable where herring are put up, to provide a storage pound or trap in which the fish may be placed and kept alive and from which they may be withdrawn as they can be handled in the factory. To use such a storage pound or trap, means must be provided for bringing the fish from the points where they are caught thereto in such a manner that they will not be injured. They can not be towed while they are in the net, as this would kill them, and it is very undesirable to remove them from the water by the net and in that way transfer them to a towing barge. I therefore devise the apparatus herein illustrated.

As a means for transporting the fish between the points where they are caught and the storage pound, I employ a barge 1, which barge is inclosed at the bottom and the two sides, and one end, but which has its stern open, as shown at 10. At the stern the barge is thus freely open to the sea. Within this barge is placed a net 2, which is of such size and shape as to form a lining to the well, which well constitutes, in the barge as shown, substantially the entire interior of the barge. The size of this well may of course be reduced if there is any reason for doing this.

Means are provided whereby the net may be secured by its upper edge to the barge, as for instance, by providing rings 20 which may be secured upon hooks 21 or other device, carried by the barge. I also provide at the front corners of the well of the barge, rings 22, to which are secured ropes 3, which ropes may be led over guide rollers 30 at the stern of the barge. I also provide rings 23 secured to the net at such a point that these rings will lie at the lower forward corners of the well in the barge, and provide pulleys, as 31, secured at the lower forward corner of the well so that the net may be pulled down into this corner. A rope 32, secured to the ring 23 and passing through the pulley 31, may be used for doing this work.

In filling the barge the stern thereof is brought up to the net 5 in which the fish have been caught and the net 5 is emptied into the barge by lowering somewhat the portion of the net 2 which closes the opening at the rear of the barge and then raising the net 5 so as to spill its contents into the barge. In this manner the catches of a number of nets may be discharged into the barge where they will be held securely and without their having been injured.

During the filling, the net closing the rear of the barge would be lowered below the water level and consequently the fish at no time would be removed or lifted from the water, and in no wise injured. When the contents of all the nets have been discharged into the barge, or when it has received as great a load as is advisable to take, it is towed to the factory.

At this point a storage pound, represented at 4, in Fig. 3, is provided. This has an opening 40 which is closable by a net or other means, to which the stern of the barge is brought and the stern end of the net in the barge is then lowered and secured in position for discharging its contents into the pound.

The rope 32, which holds down the forward end of the net in the barge, is then slackened off and the rope 3 hauled in to the pound, which causes the forward end of the net in the barge to be drawn toward the rear and in this way the contents of the barge is unloaded into the pound. In this manner fish may be taken from the net to the pound without being in any wise injured.

What I claim as my invention is:

1. A live fish transporting means comprising a box-like float having an opening in one side extending well below the water line, a lining net for the float and means for discharging the float by pulling the net out through said opening.

2. A live fish transporting means comprising a box-like float having an opening at one side extending well below the water line, a net lining the float and means for lowering the net at this opening and pulling the rest of the net to this opening to thereby discharge the fish without removing them from the water.

3. A live fish transporting means comprising a barge having an opening at its end extending well below the water line and a net forming a lining for the barge, means whereby the net may be lowered at the said opening to permit discharge of the fish from the net by which they are caught into the barge, and means for lifting said barge-lining net to discharge the fish through the same opening.

4. A live fish transporting means comprising a barge having a well therein having one side connected with the sea by an opening extending below the water line, a net serving as a lining for said well and to close the side opening, lines connected with the net at the farther end of the well from said opening and a guide for one of said lines placed at the bottom of the well at the end farthest from said opening.

5. A live fish transporting means comprising a barge having a closed bottom and sides except for an opening at one end extending well below the water line, a net forming a lining for said barge and adapted to close the said opening, said net being detachable to permit lifting thereof to discharge its contents through said opening at the stern.

6. A barge for transporting and handling live fish having a gateway in its stern extending well below the water line and sides otherwise closed, and a flexible lining net detachably secured in place and adapted to be drawn toward said gateway to discharge the fish.

7. A device for transporting live fish comprising a float having walls inclosing a central space and adapted to act as breakwaters for said central space when the device is being towed, and having a free opening at one side extending well beneath the water level and a flexible lining therefor adapted to be drawn toward said opening to discharge the fish without removing them from the water.

Signed at Seattle, Washington, this 10th day of October, 1918.

LEE H. WAKEFIELD.